United States Patent
Kane et al.

(10) Patent No.: US 7,283,897 B2
(45) Date of Patent: Oct. 16, 2007

(54) METHOD AND SYSTEM FOR COMPENSATING FOR WHEEL WEAR ON A TRAIN

(75) Inventors: Mark Edward Kane, Orange Park, FL (US); James Francis Shockley, Orange Park, FL (US); Harrison Thomas Hickenlooper, Palatka, FL (US)

(73) Assignee: Quantum Engineering, Inc., Orange Park, FL (US)

( * ) Notice: Subject to any disclaimer, the term of this patent is extended or adjusted under 35 U.S.C. 154(b) by 367 days.

(21) Appl. No.: 10/609,377

(22) Filed: Jul. 1, 2003

(65) Prior Publication Data
US 2004/0006411 A1    Jan. 8, 2004

Related U.S. Application Data

(63) Continuation-in-part of application No. 10/157,874, filed on May 31, 2002, now Pat. No. 6,701,228.

(51) Int. Cl.
*G06F 7/38* (2006.01)
*B61L 25/02* (2006.01)
*G01C 22/0002* (2006.01)

(52) U.S. Cl. .......................... 701/19; 324/166; 701/70; 104/96; 104/118; 105/154; 105/155

(58) Field of Classification Search ................ 701/200, 701/213, 19–20, 201, 207, 70; 246/122 R; 73/146; 702/85; 324/166; 104/96, 118; 105/154–155; B26J 39/00; A63B 24/00; A63C 11/00; G01P 1/00; B61K 9/12; B61L 3/00
See application file for complete search history.

(56) References Cited

U.S. PATENT DOCUMENTS

| | | | |
|---|---|---|---|
| 4,181,943 A | 1/1980 | Mercer, Sr. et al. | |
| 4,459,668 A | 7/1984 | Inoue et al. | |
| 4,561,057 A | 12/1985 | Haley, Jr. et al. | |
| 4,709,194 A * | 11/1987 | Yagi et al. | .......... 318/52 |
| 4,711,418 A | 12/1987 | Aver, Jr. et al. | |

(Continued)

FOREIGN PATENT DOCUMENTS

DE    3445812 A  *  6/1986

(Continued)

OTHER PUBLICATIONS

Kull et al., Rail navigation system, priority date: Feb. 20, 1996, from Dialog(R) acc. No. 00858964, File 348: European Patents EP 791518 A1 filed on Aug. 27, 1997.*

(Continued)

*Primary Examiner*—Cuong Nguyen
(74) *Attorney, Agent, or Firm*—DLA Piper US LLP

(57) ABSTRACT

A method and system for compensating for wheel wear uses position and/or speed information from an independent positioning system to measure some distance over which the train has traveled. Wheel rotation information is also collected over the distance. The wheel rotation information and distance and/or speed information are then used to determine the size of the train wheels. The method is performed periodically to correct for changes in wheel size over time due to wear so that the wheel rotation information can be used to determine train position and speed in the event of a positioning system failure.

14 Claims, 4 Drawing Sheets

U.S. PATENT DOCUMENTS

| | | | |
|---|---|---|---|
| 4,819,168 A * | 4/1989 | Laskey | 701/19 |
| 5,072,900 A | 12/1991 | Malon | |
| 5,129,605 A | 7/1992 | Burns et al. | |
| 5,155,684 A * | 10/1992 | Burke et al. | 701/25 |
| 5,177,685 A | 1/1993 | Davis et al. | |
| 5,332,180 A | 7/1994 | Peterson et al. | |
| 5,340,062 A | 8/1994 | Heggestad | |
| 5,364,047 A | 11/1994 | Petit et al. | |
| 5,394,333 A | 2/1995 | Kao | |
| 5,398,894 A | 3/1995 | Pascoe | |
| 5,452,870 A | 9/1995 | Heggestad | |
| 5,533,695 A | 7/1996 | Heggestad et al. | |
| 5,620,155 A | 4/1997 | Michalek | |
| 5,699,986 A | 12/1997 | Welk | |
| 5,740,547 A * | 4/1998 | Kull et al. | 701/19 |
| 5,751,569 A | 5/1998 | Metel et al. | |
| 5,791,425 A * | 8/1998 | Kamen et al. | 180/7.1 |
| 5,796,613 A * | 8/1998 | Kato et al. | 701/214 |
| 5,803,411 A | 9/1998 | Ackerman et al. | |
| 5,828,979 A | 10/1998 | Polivka et al. | |
| 5,867,122 A | 2/1999 | Zahm et al. | |
| 5,908,466 A * | 6/1999 | Veugen et al. | 701/224 |
| 5,944,768 A | 8/1999 | Ito et al. | |
| 5,950,966 A | 9/1999 | Hungate et al. | |
| 5,978,718 A * | 11/1999 | Kull | 701/19 |
| 5,995,881 A | 11/1999 | Kull | |
| 6,049,745 A | 4/2000 | Douglas et al. | |
| 6,081,769 A | 6/2000 | Curtis | |
| 6,102,340 A | 8/2000 | Peek et al. | |
| 6,112,142 A | 8/2000 | Shockley et al. | |
| 6,135,396 A | 10/2000 | Whitfield et al. | |
| 6,148,269 A * | 11/2000 | Kumar et al. | 702/96 |
| 6,179,252 B1 | 1/2001 | Roop et al. | |
| 6,218,961 B1 | 4/2001 | Gross et al. | |
| 6,219,609 B1 * | 4/2001 | Matsuno et al. | 701/72 |
| 6,311,109 B1 | 10/2001 | Hawthorne et al. | |
| 6,322,025 B1 | 11/2001 | Colbert et al. | |
| 6,345,233 B1 | 2/2002 | Erick | |
| 6,347,265 B1 * | 2/2002 | Bidaud | 701/19 |
| 6,360,165 B1 * | 3/2002 | Chowdhary | 701/205 |
| 6,371,416 B1 | 4/2002 | Hawthorne | |
| 6,373,403 B1 * | 4/2002 | Korver et al. | 340/988 |
| 6,374,184 B1 | 4/2002 | Zahm et al. | |
| 6,377,877 B1 | 4/2002 | Doner | |
| 6,381,536 B1 * | 4/2002 | Satoh et al. | 701/208 |
| 6,397,147 B1 | 5/2002 | Whitehead | |
| 6,401,036 B1 * | 6/2002 | Geier et al. | 701/214 |
| 6,421,587 B2 | 7/2002 | Diana et al. | |
| 6,446,005 B1 * | 9/2002 | Bingeman et al. | 701/215 |
| 6,456,937 B1 | 9/2002 | Doner et al. | |
| 6,459,964 B1 | 10/2002 | Vu et al. | |
| 6,459,965 B1 | 10/2002 | Polivka et al. | |
| 6,487,478 B1 | 11/2002 | Azzaro et al. | |
| 6,609,049 B1 | 8/2003 | Kane et al. | |
| 6,611,755 B1 * | 8/2003 | Coffee et al. | 701/213 |
| 6,701,228 B2 * | 3/2004 | Kane et al. | 701/19 |
| 2001/0056544 A1 | 12/2001 | Walker | |
| 2002/0070879 A1 | 6/2002 | Gazit et al. | |
| 2003/0036847 A1 * | 2/2003 | Geier et al. | |
| 2003/0093188 A1 * | 5/2003 | Morita et al. | |
| 2003/0163255 A1 * | 8/2003 | Ishigami et al. | |
| 2003/0225490 A1 * | 12/2003 | Kane et al. | 701/19 |

FOREIGN PATENT DOCUMENTS

| | | | |
|---|---|---|---|
| DE | 3569008 G | * | 4/1989 |
| DE | 3717531 C2 | * | 12/1993 |
| EP | 185246 B | * | 3/1989 |

OTHER PUBLICATIONS

Haollberg, Method and device for detecting wheels with deformed treads in railroad vehicles, priority SE 844092 on Aug. 14, 1984, from DIALOG(R) File 349 (PCT FULLTEXT)—acc. No. 00128663, WO 8601167 A1 (Feb. 27, 1986).*

Cameron, Speed and distance calculatorfor skis, DIALOG(R) File 349, acc. No. 00137401: PCT FULLTEXT), WO 8702261 A1 (Apr. 23, 1987).*

Takeda et al., Bicycle display apparatus with distributed processing, from DIALOG(R) File 348: European Patents, acc. No. 01781234; EP 1452431 A1 (Jan. 9, 2004).*

J. Mar et al., Simulations of the positioning accuracy of integrated vehicular navigation systems, IEE Proc. Radar, Sonar Navig. vol. 143, No. 2, Apr. 1996.*

Steve Nicks, Condition Monitoring of the Track/Train Inerface, 1998 The Institution of Electrical Engineers, London UK, pp. 7/1-7/6.*

Thanh Vu et al., Interim Report on Condition Monitoring of Wheel and Rail, (TRAINS-REPORT/VHT/02) The University of Birmingham and Manchester Metropolitan University 2002.*

M. Kayton, Navigation: ships to space, Aerospace and Electronic Systems, IEEE Transactions on, vol. 24, Issue 5, Sep. 1988 pp. 474-519, Digital Object Identifier 10.1109/7.9678.*

S. S. Saab et al., Compensation of axle-generator errors due to wheel slip and slide, Vehicular Technology, IEEE Transactions on vol. 51, Issue 3, May 2002 pp. 577-587, Digital Object Identifier 10.1109/TVT.2002.1002506.*

S. Saab, "A map matching approach for train positioning\—Part I: Development and analysis," IEEE Trans. Veh. Technol., vol. 49, pp. 467-475, Mar. 2000.*

P. Heide, V. Magori, and R. Schwarte, "Coded 24 GHz doppler radar sensors: A new approach to high-precision vehicle position and ground-speed sensing in railway and automobile applications," in Proc. IEEE MTT-S Int. Microwave Symp. Dig. Orlando, FL, vol. 2, May 1995, pp. 965-968.*

T. Engelberg, "Design of correlation system for speed measurement of rail vehicles," J. Int. Measurement Confederation, vol. 29, pp. 157-164, Mar. 2001.*

The solution of municipal rapid transit, Sprague, F.J.; Proceedings of the IEEE, vol. 72, Issue 2, Feb. 1984 pp. 175-195.*

Teito rapid transit authority's automatic train operation, Shirai, Y.; Ishihara, Y.; Proceedings of the IEEE, vol. 56, Issue 4, Apr. 1968 pp. 605-615.*

Motorcycle modeling for high-performance maneuvering, Hauser, J.; Saccon, A.; Control Systems Magazine, IEEE vol. 26, Issue 5, Oct. 2006 pp. 89-105.*

Programmable digital vehicle control system, Lang, R.P.; Freitag, D.B.; Vehicular Technology, IEEE Transactions on vol. 28, Issue 1, Feb. 1979 pp. 80-87.*

General survey of the possible applications and development tendencies of magnetic levitation technology, Rogg, D.; Magnetics, IEEE Transactions on, vol. 20, Issue 5, Sep. 1984 pp. 1696-1701.*

Learning based on conceptual distance, Kodratoff, Y.; Tecuci, G.; Pattern Analysis and Machine Intelligence, IEEE Transactions on, vol. 10, Issue 6, Nov. 1988 pp. 897-909, Digital Object Identifier 10.1109/34.9111.*

Programmable digital vehicle control system, Lang, R.P.; Freitag, D.B.; Vehicular Technology Conference, 1978. 28th IEEE vol. 28, Mar. 22-24, 1978 pp. 329-335.*

Field demonstrations of two prototype high-speed tribometers, Reiff, R.; Cooke, J.; Railroad Conference, 1999. Proceedings of the 1999 ASME/IEEE Joint, Apr. 13-15, 1999 pp. 184-195, Digital Object Identifier 10.1109/RRCON.1999.762418.*

Optimising vehicle positioning systems on automatic railways-a case study, Wallace, P.R.; Developments in Mass Transit Systems, 1998. International Conference on (Conf. Publ. No. 453), Apr. 20-23, 1998 pp. 202-207.*

"Testimony of Jolene M. Molitoris, Federal Railroad Administrator, U.S. Department of Transporatation before the House Committee on Transportation and Infrastructure Subcommittee on Railroads", Federal Railroad Administration, United States Department of Transportation, Apr. 1, 1998.

"System Architecture, ATCS Specification 100", May 1995.

"A New World for Communications & Signaling", Progressive Railroading, May 1986.

"Advanced Train Control Gain Momentum", Progressive Railroading, Mar. 1986.

"Railroads Take High Tech in Stride", Progressive Railroading, May 1985.

Lyle, Denise, "Positive Train Control on CSXT", Railway Fuel and Operating Officers Association, Annual Proceedings, 2000.

Lindsey, Ron A., "C B T M, Communications Based Train Management", Railway Fuel and Operating Officers Association, Annual Proceedings, 1999.

Moody, Howard G, "Advanced Train Control Systems A System to Manage Railroad Operations", Railway Fuel and Operating Officers Association, Annual Proceedings, 1993.

Ruegg, G.A., "Advanced Train Control Systems ATCS", Railway Fuel and Operating Officers Association, Annual Proceedings, 1986.

Malone, Frank, "The Gaps Start to Close"Progressive Railroading, May 1987.

"On the Threshold of ATCS", Progressive Railroading, Dec. 1987.

"CP Advances in Train Control", Progressive Railroading, Sep. 1987.

"Communications/Signaling: Vital for dramatic railroad advances", Progressive Railroading, May 1988.

"ATCS's System Engineer", Progressive Railroading, Jul. 1988.

"The Electronic Railroad Emerges", Progressive Railroading, May 1989.

"$C^3$ Comes to the Railroads", Progressive Railroading, Sep. 1989.

"ATCS on Verge of Implementation", Progressive Railroading, Dec. 1989.

"ATCS Evolving on Railroads", Progressive Railroading, Dec. 1992.

"High Tech Advances Keep Railroads Rolling", Progressive Railroading, May 1994.

"FRA Promotes Technology to Avoid Train-To-Train Collisions", Progressive Railroading, Aug. 1994.

"ATCS Moving slowly but Steadily from Lab for Field", Progressive Railroading, Dec. 1994.

Judge, T., "Electronic Advances Keep Railroads Rolling", Progressive Railroading, Jun. 1995.

"Electronic Advances Improve How Railroads Manage", Progressive Railroading, Dec. 1995.

Judge, T., "BNSF/UP PTS Pilot Advances in Northwest", Progressive Railroading, May 1996.

Foran, P., "Train Control Quandary, Is CBTC viable? Railroads, Suppliers Hope Pilot Projects Provide Clues", Progressive Railroading, Jun. 1997.

"PTS Would've Prevented Silver Spring Crash: NTSB", Progressive Railroading, Jul. 1997.

Foran, P., "A 'Positive' Answer to the Interoperability Call", Progressive Railroading, Sep. 1997.

Foran, P., "How Safe is Safe Enough?", Progressive Railroading, Oct. 1997.

Foran, P., "A Controlling Interest In Interoperability", Progressive Railroading, Apr. 1998.

Derocher, Robert J., "Transit Projects Setting Pace for Train Control", Progressive Railroading, Jun. 1998.

Kube, K., "Variations on a Theme", Progressive Railroading, Dec. 2001.

Kube, K., "Innovation in Inches", Progressive Railroading, Feb. 2002.

Vantuono, W., "New York Leads a Revolution", Railway Age, Sep. 1996.

Vantuono, W., "Do you know where your train is?", Railway Age, Feb. 1996.

Gallamore, R., "The Curtain Rises on the Next Generation", Railway Age, Jul. 1998.

Burke, J., "How R&D is Shaping the 21st Century Railroad", Railway Age, Aug. 1998.

Vantuono, W., "CBTC: A Maturing Technology", Third International Conference On Communications Based Train Control, Railway Age, Jun. 1999.

Sullivan, T., "PTC—Is FRA Pushing Too Hard?", Railway Age, Aug. 1999.

Sullivan T., "PTC: A Maturing Technology", Railway Age, Apr. 2000.

Moore, W., "How CBTC Can Increase Capacity", Railway Age, Apr. 2001.

Vantuono, W., "CBTC: The Jury is Still Out", Railway Age, Jun. 2001.

Vantuono, W., "New-tech Train Control Takes Off", Railway Age, May 2002.

Union Switch & Signal Intermittent Cab Signal, Bulletin 53, 1998.

GE Harris Product Sheet: "Advanced Systems for Optimizing Rail Performance" and "Advanced Products for Optimizing train Performance", undated.

GE Harris Product Sheet: "Advanced, Satellite-Based Warning System Enhances Operating Safety", undated.

Furman, E., et al., "Keeping Track of RF", GPS World, Feb. 2001.

Department of Transportation Federal Railroad Administration, Federal Register, vol. 66, No. 155, pp. 42352-42396, Aug. 10, 2001.

\* cited by examiner

METHOD AND SYSTEM FOR COMPENSATING FOR WHEEL WEAR ON A TRAIN

This application is a Continuation-In-Part of application Ser. No. 10/157,874, filed May 31, 2002 now U.S. Pat. No. 6,701,228 the entirety of which is incorporated herein by reference.

BACKGROUND OF THE INVENTION

1. Field of the Invention

The invention relates to railroads generally, and more particularly to a system and method for determining wheel size to compensate for wheel wear.

2. Discussion of the Background

Controlling the movement of trains in a modern environment is a complex process. Collisions with other trains must be avoided and regulations in areas such as grade crossings must be complied with. The pressure to increase the performance of rail systems, in terms of speed, reliability and safety, has led to many proposals to automate various aspects of train operation. For example, positive train control (PTC) and automatic train control (ATC) systems have been widely discussed in recent years.

Some automated systems rely on global positioning system (GPS) receivers for indications of train speed and position (as used herein, "global positioning system" and "GPS" refer to all varieties of global positioning system receivers, including, but not limited to, differential global positioning system receivers. Still other systems use inertial navigation systems (INSs) for determining speed and location. However, GPS receivers and INSs sometimes fail, and for that reason it is desirable to have a back-up system.

One method that can be used in case of a positioning system failure is to measure the rotation of motor, axle or wheel rotation to determine the speed at which a train is traveling and/or the distance which a train has traveled. Each time the wheel makes a compete revolution, the distance traveled by the wheel is equal to its circumference in the absence of any slippage. Thus, if the radius R of the wheel is known, the distance traveled for each revolution of the wheel is equal to $2\pi R$. However, the radius of a wheel changes over time due to wheel wear. For example, a standard train wheel can decrease in size from 40 inches to 36 inches over its useful life. Therefore, the distance traveled in each wheel revolution can vary between 125.7" and 113.1", a difference of approximately 12.6" or 10%. This error is significant.

What is needed is a method and system that compensates for wheel wear.

SUMMARY OF THE INVENTION

The present invention meets the aforementioned need to a great extent by providing a method and system for compensating for wheel wear in which wheel rotation information from a revolution counter or a tachometer and position and/or speed information from an independent positioning system such as GPS or INS are measured over a predetermined distance and used to determine the size of the train wheels. This process is performed periodically to compensate for wheel wear.

In one aspect of the invention, the system includes a map database and the position information from the independent positioning system is used to as an index to ensure that the rotation data used for the speed/position comparison between the position system and rotation data is collected in an area of straight and flat track so as to exclude errors in the rotation data caused by wheel slippage and turns.

In another aspect of the invention, the data used for the comparison between the speeds/distances indicated by the positioning system and by the rotation data is collected over a long distance to minimize known errors in the positioning system. In yet another aspect of the invention, a total distance traveled is calculated using an integration technique by adding a plurality of linear differences in successive positions reported by the positioning system over short periods of time. This technique is particularly advantageous when performed over curved sections of track.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein.

DETAILED DESCRIPTION OF PREFERRED EMBODIMENTS

The present invention will be discussed with reference to preferred embodiments of train control systems. Specific details, such as wheel sizes and types of positioning systems, are set forth in order to provide a thorough understanding of the present invention. The preferred embodiments and specific details discussed herein should not be understood to limit the invention.

Figure 1:
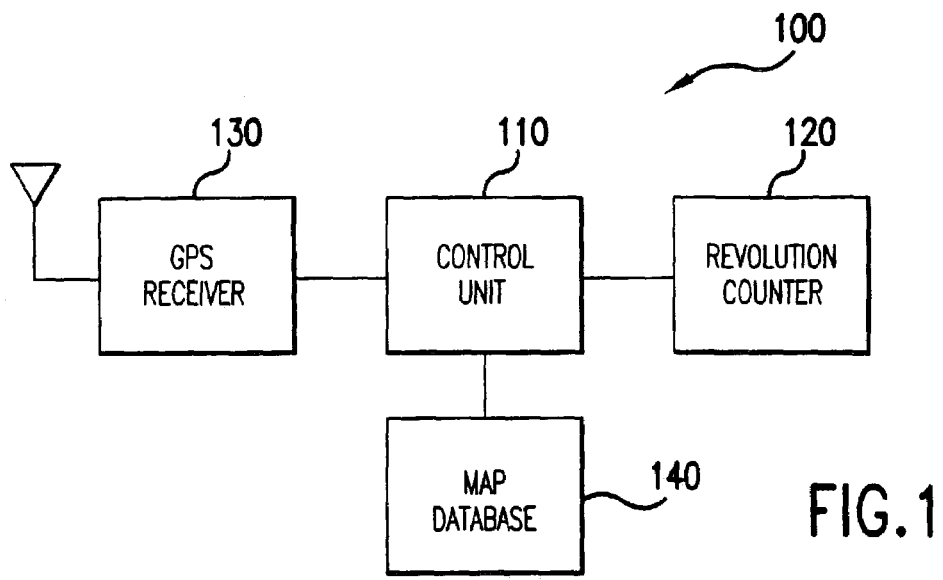
FIG. 1 is a logical block diagram of a train control system according to one embodiment of the invention.

Referring now to the drawings, wherein like reference numerals designate identical or corresponding parts throughout the several views, FIG. 1 is a logical block diagram of a train control system 100 according to the present invention. The system 100 includes a control module 110, which typically, but not necessarily, includes a microprocessor. The control module 110 is connected to a revolution counter 120. The revolution counter 120 measures rotation of a locomotive wheel (not shown in FIG. 1) on a train. The revolution counter 120 may be of any type, including mechanical, magnetic, and optical. The revolution counter 120 may measure the rotation of a wheel directly, or may measure rotation of an axle to which the wheel is connected, or may measure rotation of a motor driveshaft or gear that powers the wheel.

Also connected to the control module 110 is a positioning system such as a GPS receiver 130. The GPS 130 receiver can be of any type, including a differential GPS receiver. Other types of positioning systems, such as inertial navigation systems (INSs) and Loran systems, can also be used.

[As used herein, the term "positioning system" refers to the portion of a positioning system that is commonly located on a mobile vehicle, which may or may not comprise the entire system. Thus, for example, in connection with a global positioning system, the term "positioning system" as used herein refers to a GPS receiver and does not include the satellites that are used to transmit information to the GPS receiver.] The GPS receiver 130 provides position and speed information to the control module 110.

The control module 110 uses the position information from the GPS receiver 130 as an index into a map database 140. The map database 140 provides information including track grade and curvature to the control module 110. As will be explained in further detail below, this information is used in some embodiments to ensure that rotation information from the revolution counter will not include rotation information that is corrupted due to wheel slippage and/or errors due to track curvature.

Figure 2:
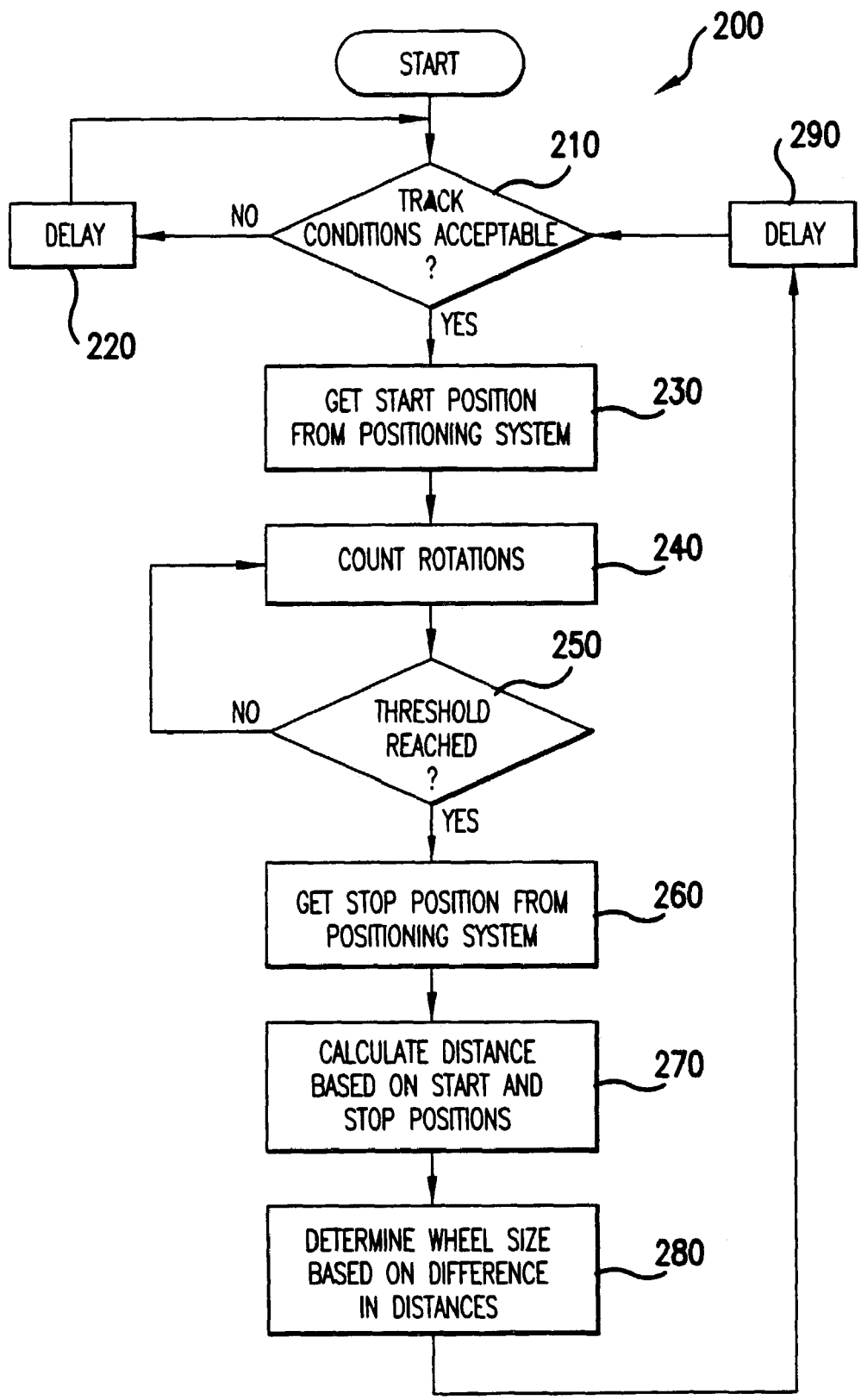
FIG. 2 is a flowchart showing a wheel wear compensation technique according to one embodiment of the invention.

Referring now to FIG. 2, a flowchart 200 illustrates operation of a wheel wear correction method according to one embodiment of the present invention. The control module 110 determines whether track conditions are acceptable at step 210. In some embodiments, this is accomplished by obtaining the current position from the GPS receiver 130 and indexing the map database 140 to determine the track grade and curvature over a predetermined length of upcoming track over which rotation information is to be collected.

The predetermined length of track is preferably of a sufficient length such that any errors introduced by the inaccuracy of the global positioning system receiver 130 are minimized. Obviously, it is advantageous to use as great a length as possible since the effect of positioning systems errors are decreased as the length is increased. However, there is a trade-off that must be made because if the length is too great, the time required to complete the wheel correction algorithm is too long and/or the amount of curvature and grade in the track segment over which the data is to be taken preclude running the algorithm over too much track in the system. In some embodiments, the predetermined length of track is 100,000 meters. In such an embodiment, with a global positioning system having a position error on the order of 30 meters, the total error is equal to (30+30)/100,000=0.0006=0.06%.

In the embodiment described by FIG. 2, the determination as to whether track conditions are acceptable is made at the start of the algorithm. In other embodiments, rotation data is only collected if the train is traveling greater than some minimum. The reason behind this is that most wheel slippage occurs at slow speeds as a locomotive is attempting to accelerate. Most locomotives use electric induction motors, and most electric motors used in locomotives have torque curves with torques decreasing as speed increases such that it is not possible for the locomotive to generate enough torque to cause the wheels to slip above certain speeds. In some embodiments, the minimum speed at which data will be collected is 15 m.p.h.; in other embodiments, the minimum speed is 20 m.p.h.

In yet other embodiments, the wheel acceleration is monitored to detect wheel slippage. If an acceleration exceeds a threshold, the collected information is discarded and the entire process is started over.

In still other embodiments, the system notes the upcoming sections of the track in which either the grade or curvature is above a corresponding threshold and does not include those distances and any corresponding rotation information collected over those distances in the calculations. Such embodiments are particularly useful for railroads in which long, straight and level sections of track are not present in many areas.

If the track conditions are not favorable at step 210, the system delays for a period of time at step 220 and repeats step 210 until track conditions are favorable. When track conditions are favorable at step 210, the control module 110 determines a start position from the global positioning receiver 130 at step 230 and counts rotations as measured by the revolution counter 120 at step 240. When a threshold (which may be a number of rotations and/or a time period) has been reached at step 250, the control module 110 determines a stop position from the global positioning receiver 130 at step 260. Next, at step 270, the control module 130 calculates the distance D traveled based on the start and stop positions measured at steps 230 and 260, respectively. Then the control module 130 determines the radius R of the wheel at step 280 according to the equation $R=D/2\pi T_r$, where $T_r$ is the total number of rotations counted over the distance D. The module 110 then delays, at step 290, for a period of time such as a day (it is not necessary to run the algorithm often as train wheels wear slowly).

In the above-discussed embodiments, a predetermined distance is used. It should be noted that the predetermined distance will vary depending upon the accuracy of the positioning system used and the particular environment in which the invention is used.

In the foregoing embodiments, data is not collected when the system determines that track conditions are not favorable. However, in cases where curvature exceeds the threshold, it is also possible to allow data collection to occur and correct the data for the curvature.

Figure 4A:
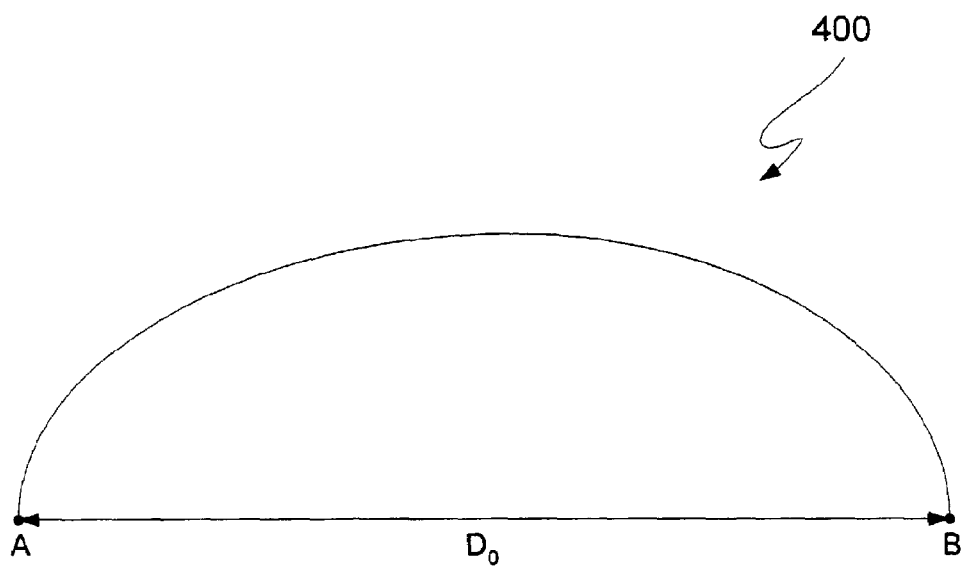
FIGS. 4(*a*) and 4(*b*) are, respectively, schematic drawings of distance calculated by a linear method and an integration method according to an embodiment of the present invention.
Figure 4B:
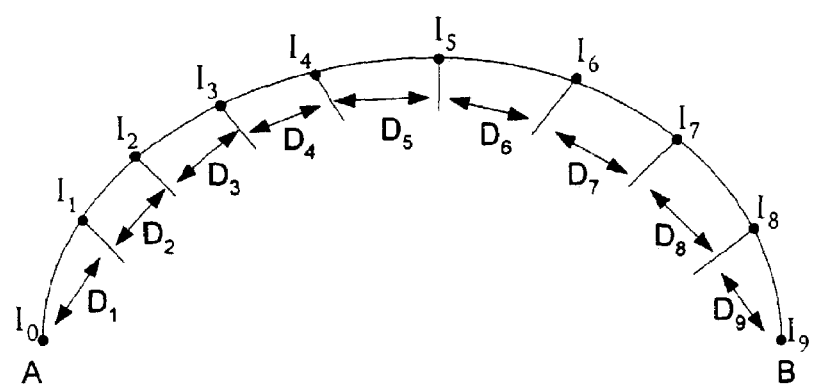

In another embodiment of the invention, an integration technique is utilized to correct for track curvature. In this technique, the total distance traveled is determined by adding linear differences between positions reported by the positioning system at a plurality of short intervals. In this manner, the sum of linear distances closely approximates the actual "track distance" (the actual distance traveled by the train over the track). Consider the examples shown in FIGS. 4(a) and 4(b), which illustrate a section of track 400 between two points A and B. In FIG. 4(a), a linear distance $D_o$ between points A and B is illustrated. This distance $D_o$ is obviously less than the actual track distance between points A and B. In FIG. 4(b), several linear distances $D_{1-9}$ between a plurality of intermediate points $I_{0-9}$ are calculated. The sum of these linear distances $D_{1-9}$ is a much closer approximation of the track distance between points A and B. As the distance between the intermediate points $I_{0-9}$ decreases, the approximation of the actual track distance becomes more accurate.

Figure 5:
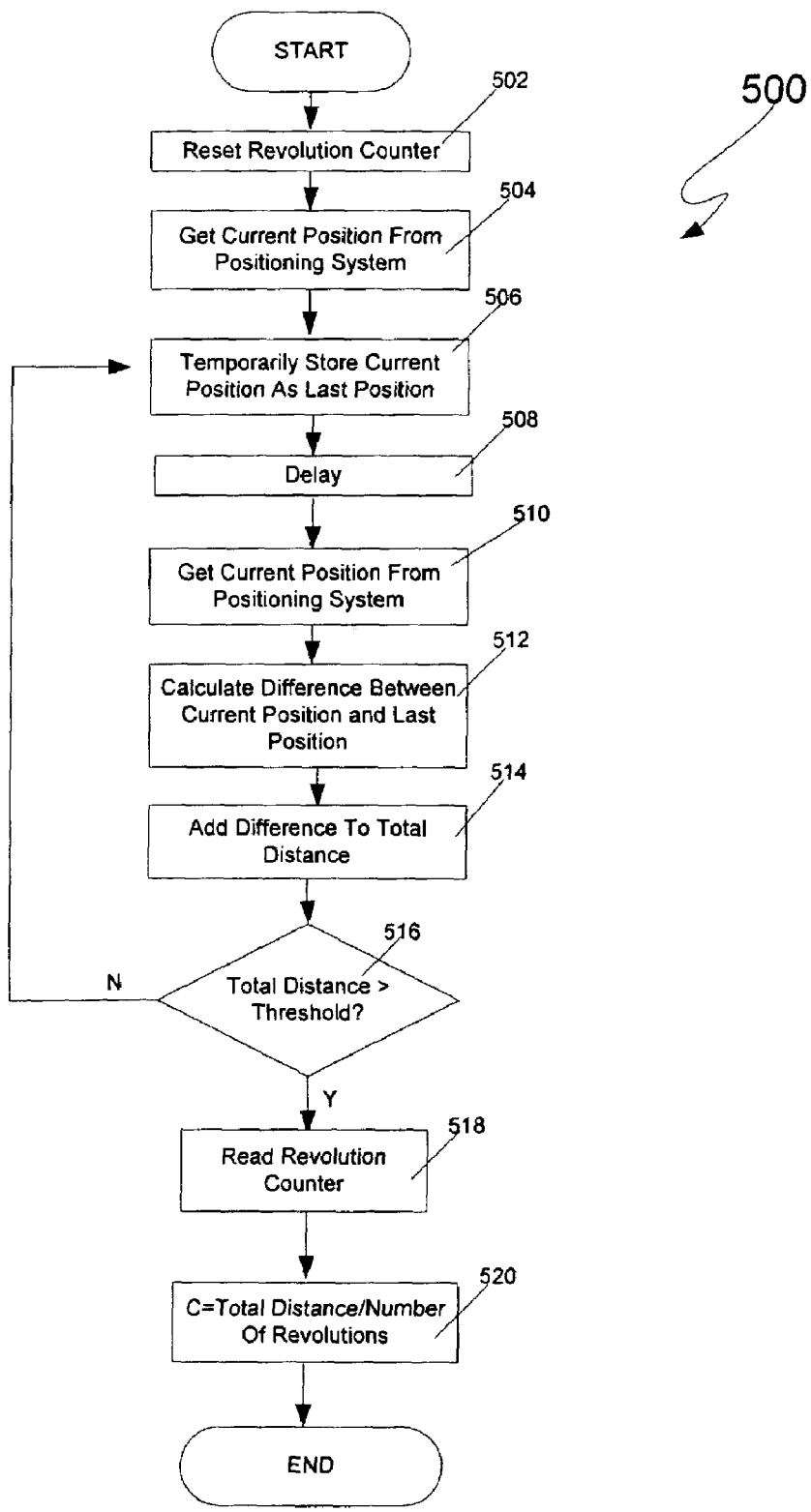
FIG. 5 is a flowchart of a wheel wear compensation technique employing the integration method of FIG. 4(*b*) according to an embodiment of the invention.

FIG. 5 illustrates a flow chart 500 of the steps performed by the control module 110 in an embodiment employing this integration technique. The revolution counter 120 is reset to zero at step 502 (in other embodiments, the revolution counter is simply read at step 502). The position is then obtained from the positioning system 130 at step 504 and temporarily stored as the last position at step 506. The control module 110 then delays for a period of time at step 508. As discussed above, the shorter the period is, the more accurate the approximation will be. In preferred embodiments, the period is one second.

After the delay at step 508, the control module 110 again obtains the current position at step 510. Next, the linear difference between the current position and the temporarily stored last position is calculated at step 512 and the difference is added to a total distance at step 514.

If the total distance does not exceed a threshold at step 516, steps 506 et seq. are repeated. As discussed above, the selection of the threshold involves a tradeoff. Again, a threshold of 100,000 meters is used in some embodiments.

If the threshold is exceeded at step 516, the revolution counter is read at step 518. The wheel circumference is then calculated by dividing the total distance by the number of revolutions from the revolution counter 120.

In the embodiment described above, the periods of time during which the total distance was traveled were contiguous such that one period began as soon as a previous period ended. This simplified the method by eliminating the necessity of reading the revolution counter at the beginning and end of each period. Those of skill in the art will recognize that it is not necessary for the periods to be contiguous and that the invention may also be practiced by using a plurality of non-contiguous periods and reading the revolution counter at the beginning and end of each period (or, alternatively, resetting the revolution counter at the beginning of each period).

In the foregoing embodiments, positional inputs from the positioning system are used; however, it will be readily apparent that speed can also be used. For example, if the current speed S of the train is known from the positioning system, then the wheel size can be determined according to the equation $S=DF_r=2\pi RF_r$, where D is the distance traveled in each rotation, $F_r$ is the rotation frequency of the wheel, and R is the radius of the wheel. In practice, the speed from the global positioning system may be read a number of times and the wheel size corresponding to each reading may be averaged. It should be noted that using speed rather than position information allows the wheel size to be determined more rapidly than using position information and is therefore preferable when wheel size is needed quickly (such as when a gross error has been detected). However, using position information, especially over a long distance, results in greater accuracy. Accordingly, in some embodiments, speed is used to rapidly generate an initial estimate and position is used to generate a better estimate at a later time.

Furthermore, while track curvature and grade were determined by referencing a map database in the embodiments discussed above, it will be readily recognized by those of skill in the art that curvature and grade can be determined from altitude and direction information provided by the global positioning system. For example, the track curvature may be determined by recording the train's position as reported by the positioning system at several times during the period in which data is collected. This position information can be used to construct a curvature profile so that the amount of curvature can be determined after the data is collected. If the curvature is greater than a threshold, the data can be ignored, or, in some embodiments, can be corrected for the curvature such as by using the integration technique discussed herein. The same techniques can be used to construct a grade profile.

It should also be noted that the invention may be incorporated into various types of train control systems, including the aforementioned PTC and ATC systems as well as many others.

In another embodiment of the invention, the wheel wear compensation method is incorporated into a wheel revolution sensor signal distribution/conversion system such as the QUIP™ system manufactured by the assignee of the present invention, Quantum Engineering. There may be several systems on board a train that input a signal representative of the wheel rotation and use that signal to calculate speed. For example, many locomotives that have been retro-fitted with a train control system also are equipped with a separate speed display. Such systems typically require the conductor/engineer or maintenance personnel to measure the diameter of the train wheel to which the wheel sensor is attached and set DIP switches or otherwise configure the devices to indicate the wheel size. Because the wheel size changes over time as discussed above, these other devices must be reconfigured on some periodic basis, thereby increasing labor costs.

Because there may be several systems that require the wheel sensor signal which together constitute a larger electrical load than the wheel sensor is capable of handling, and because some of these systems require an input signal of a different form than is supplied by the wheel sensor, signal conversion/distribution systems such as the aforementioned QUIP™ distribution/conversion system have been devised. A substantial savings can be realized by modifying these distribution/conversion systems to output a modified signal that is representative of a wheel sensor signal would be generated by a wheel of a fixed size. Thus, for example, if the conversion/distribution system outputs a modified wheel sensor signal that is representative of a 40 inch wheel, each of the other systems that use the wheel sensor signal could be configured once for a 40 inch wheel and would thereafter not need to be periodically reconfigured.

Figure 3:
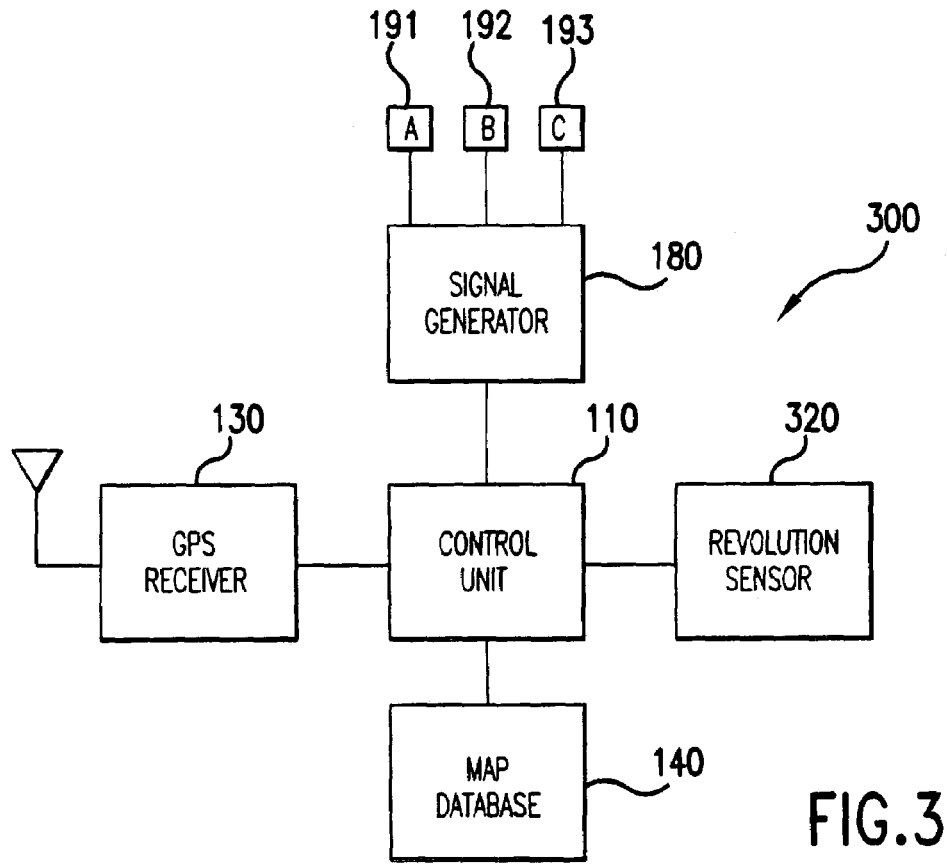
FIG. 3 is a logical block diagram of a train speed signal distribution system according to another embodiment of the present invention.

Such a conversion/distribution system 300 is illustrated in FIG. 3. The system includes a control unit 110 connected to a wheel revolution sensor 320. In some embodiments, the wheel sensor 320 outputs a square wave, with each rising edge representing a revolution of the wheel. Thus, the time between leading edges represents the time taken for one full revolution of the wheel. It will be readily understood that the signal output by the wheel sensor 320 may be of many forms, analog or digital, and that the particular form of the signal is not important. Also connected to the control unit 110 is a GPS receiver 130 and a map database 140. The control unit 110 is configured to determine the wheel size using the method described in FIG. 2 or one of the other methods described herein. The control unit 110 determines the speed of the train, which can be taken from the GPS receiver 130 or can be determined with the knowledge of the previously determined wheel size. Using the actual speed of the train, the control unit 110 then determines the parameters necessary for a signal that would be representative of the signal that would be generated by the wheel sensor 320 if the wheel were a predetermined size such as 40". For example, where the wheel sensor outputs a square wave signal as discussed above, the period of the square wave when the train is traveling 30 m.p.h. would be the distance traveled by one revolution, $2*\pi*20$ inches, divided by the train speed, 30 m.p.h. or 528 inches/sec, which is equal to 125.7/528=0.238 seconds. This 0.238 second period is supplied by the control unit 110 to a signal generator 180, which generates a square wave of the type discussed above with a period of 0.238 seconds. The signal generated by the signal generator 180 is then supplied to other systems A,B and C 191-193. Because the signal output by signal generator 180 will always be representative of a 40 inch wheel, it is not necessary to reconfigure the other systems 191-193 once they have been configured for a 40 inch wheel, thereby substantially reducing labor costs associated with these operations.

In the embodiment discussed above, speed is determined as part of the process of determining the parameters of the signal to be generated by the signal generator 180. It will be readily apparent to those of skill in the art that the parameters can be determined without actually calculating the speed. For example, once the wheel size is determined using the method of FIG. 2, that wheel size can be used to form a ratio of the predetermined wheel size to the actual wheel size. Thus, for example, if the predetermined wheel size is 40 inches, and the actual wheel size is 36, the ratio would be 40/36. The control unit can then measure the period of the square wave and multiply the period by the ratio to determine the period of the signal that would be generated by the wheel sensor 320 if the wheel were actually 40 inches, and supply this period to the signal generator 180 to generate this signal.

As discussed above, it is possible to generate a signal for the other devices without using the signal from the wheel sensor 320. That is, the speed can be determined from the positional system (e.g., GPS receiver 130) and the parameters of the desired signal can be sent to the signal generator so that a signal can be generated and distributed to the other systems, all without an actual wheel rotation sensor 320. This allows the system to serve as a back up for situations where the wheel sensor fails. This also allows the wheel sensor to be replaced, but such a system has the drawback that it will not provide a correct signal when the GPS system is not operational.

Obviously, numerous modifications and variations of the present invention are possible in light of the above teachings. It is therefore to be understood that within the scope of the appended claims, the invention may be practiced otherwise than as specifically described herein.

What is claimed is:

1. A method for determining a size of a wheel on a train comprising the steps of:
    determining a linear distance traveled by a train during a period of time by calculating a difference in positions reported by a positioning system located on the train at a start of the period and an end of the period;
    repeating the determining step a plurality of times;
    adding the linear distance from each of the determining steps to form a total distance; and
    calculating the wheel size based on the total distance and a total number of wheel revolutions occurring during each of the determining steps.

2. The method of claim 1, wherein the determining steps are performed successively with no separation between each period.

3. The method of claim 1, wherein the determining steps are performed with a separation between at least two successive periods for which a difference is calculated in the determining step.

4. The method of claim 1, wherein the positioning system is a global positioning system.

5. The method of claim 1, in which no portion of the total distance corresponds to a section of track having a grade exceeding a grade threshold.

6. The method of claim 5, further comprising the step of obtaining the grade from a track database using a position from the positioning system as an index.

7. The method of claim 1, wherein the period is one second.

8. A system for determining a size of a train wheel comprising:
    a control unit;
    a positioning system in communication with the control unit, the positioning system being configured to provide the control unit with positioning information pertaining to the train; and
    a revolution counter connected to the control unit, the revolution counter being configured to measure rotation of a train wheel;
    wherein the control unit is configured to perform the steps of:
        determining a linear distance traveled by a train during a period of time by calculating a difference in positions reported by-the positioning system at a start of the period and at the end of the period;
        repeating the determining step a plurality of times;
    adding the linear distance from each of the determining steps to form a total distance; and calculating the wheel size based on the total distance and a total number of wheel revolutions occurring during each of the determining steps.

9. The system of claim 8, wherein the determining steps are performed successively with no separation between each period.

10. The system of claim 8, wherein the determining steps are performed with a separation between at least two successive periods for which a difference is calculated in the determining step.

11. The system of claim 8, wherein the positioning system is a global positioning system.

12. The system of claim 8, wherein no portion of the total distance corresponds to a section of track having a grade exceeding a grade threshold.

13. The system of claim 8, further comprising the step of obtaining the grade from a track database using a position from the positioning system as an index.

14. The system of claim 8, the period is one second.

* * * * *